(12) United States Patent
Takahashi et al.

(10) Patent No.: US 9,803,770 B2
(45) Date of Patent: Oct. 31, 2017

(54) MOTOR OPERATED VALVE

(71) Applicant: TGK CO., LTD., Tokyo (JP)

(72) Inventors: Kazushi Takahashi, Tokyo (JP); Tomohiro Yuasa, Tokyo (JP); Yuto Ooe, Tokyo (JP)

(73) Assignee: TGK CO., LTD., Tokyo (JP)

( * ) Notice: Subject to any disclaimer, the term of this patent is extended or adjusted under 35 U.S.C. 154(b) by 14 days.

(21) Appl. No.: 14/938,709

(22) Filed: Nov. 11, 2015

(65) Prior Publication Data
US 2016/0146366 A1 May 26, 2016

(30) Foreign Application Priority Data

Nov. 25, 2014 (JP) .................................. 2014-237349

(51) Int. Cl.
| | | |
|---|---|---|
| F16K 31/04 | (2006.01) | |
| F16K 1/02 | (2006.01) | |
| H02K 37/24 | (2006.01) | |
| H02K 37/00 | (2006.01) | |
| F16K 3/02 | (2006.01) | |
| F25B 41/06 | (2006.01) | |
| F16K 3/00 | (2006.01) | |

(52) U.S. Cl.
CPC .............. *F16K 31/048* (2013.01); *F16K 3/00* (2013.01); *F16K 3/0218* (2013.01); *F16K 3/0254* (2013.01); *F25B 41/062* (2013.01); *H02K 37/00* (2013.01); *F25B 2341/0653* (2013.01); *Y02B 30/72* (2013.01)

(58) Field of Classification Search
CPC ... F16K 1/02; F16K 1/04; F16K 31/04; F16K 31/041; F16K 31/048; H02K 37/00; H02K 37/24; F25B 2341/062; F25B 2341/0653

USPC ............................................. 251/129.12, 266
See application file for complete search history.

(56) References Cited

U.S. PATENT DOCUMENTS

| | | | | |
|---|---|---|---|---|
| 3,558,941 A | * | 1/1971 | Visconti Brebbia ... | H02K 37/10 310/154.01 |
| 4,480,614 A | * | 11/1984 | Kobashi ................. | F02M 3/075 123/339.26 |
| 5,011,112 A | * | 4/1991 | Glamm ................... | F16K 31/04 137/901 |

(Continued)

FOREIGN PATENT DOCUMENTS

| | | | |
|---|---|---|---|
| JP | 2001-304445 | 10/2001 | ............. F16K 31/04 |
| JP | 2004-357409 | 12/2004 | ................ H02P 8/08 |
| JP | 2005-090571 | 4/2005 | ............. F16K 31/04 |

*Primary Examiner* — Seth W Mackay-Smith
(74) *Attorney, Agent, or Firm* — Martine Penilla Group, LLP

(57) ABSTRACT

A control valve includes a shaft, a stopper mechanism, and a can. A stator coil is coaxially mounted around the can. Positions in a rotating direction of the rotor and the stator when the shaft is stopped by an operation of the stopper mechanism are set to be reference positions at which magnetic poles of the stator and those of the rotor are opposite to each other. The rotor is configured to be stopped at the reference position by an arrangement of the stopper mechanism. The stator coil is positioned relative to the body according to a positional relation between a fitting part formed on surfaces of the stator and the body attached to each other and an insertion part where the can is inserted into the stator, and magnetic poles of the stator and those of the rotor are made opposite to each other at the reference positions.

8 Claims, 10 Drawing Sheets

(56) References Cited

U.S. PATENT DOCUMENTS

| | | | | |
|---|---|---|---|---|
| 5,351,935 A | * | 10/1994 | Miyoshi | F02M 26/67 251/129.05 |
| 6,211,585 B1 | * | 4/2001 | Sato | G01D 7/00 310/257 |
| 6,764,060 B2 | * | 7/2004 | Fukano | F16K 41/103 251/129.12 |
| 7,637,116 B2 | * | 12/2009 | Park | F16K 31/041 137/625.46 |
| 2006/0043325 A1 | * | 3/2006 | Umezawa | F16K 31/047 251/129.11 |
| 2006/0175565 A1 | * | 8/2006 | Nungesser | F16K 27/0254 251/129.11 |
| 2013/0002062 A1 | * | 1/2013 | Hata | H02K 37/14 310/49.55 |
| 2014/0291562 A1 | * | 10/2014 | Ooe | F16K 31/04 251/129.11 |

* cited by examiner

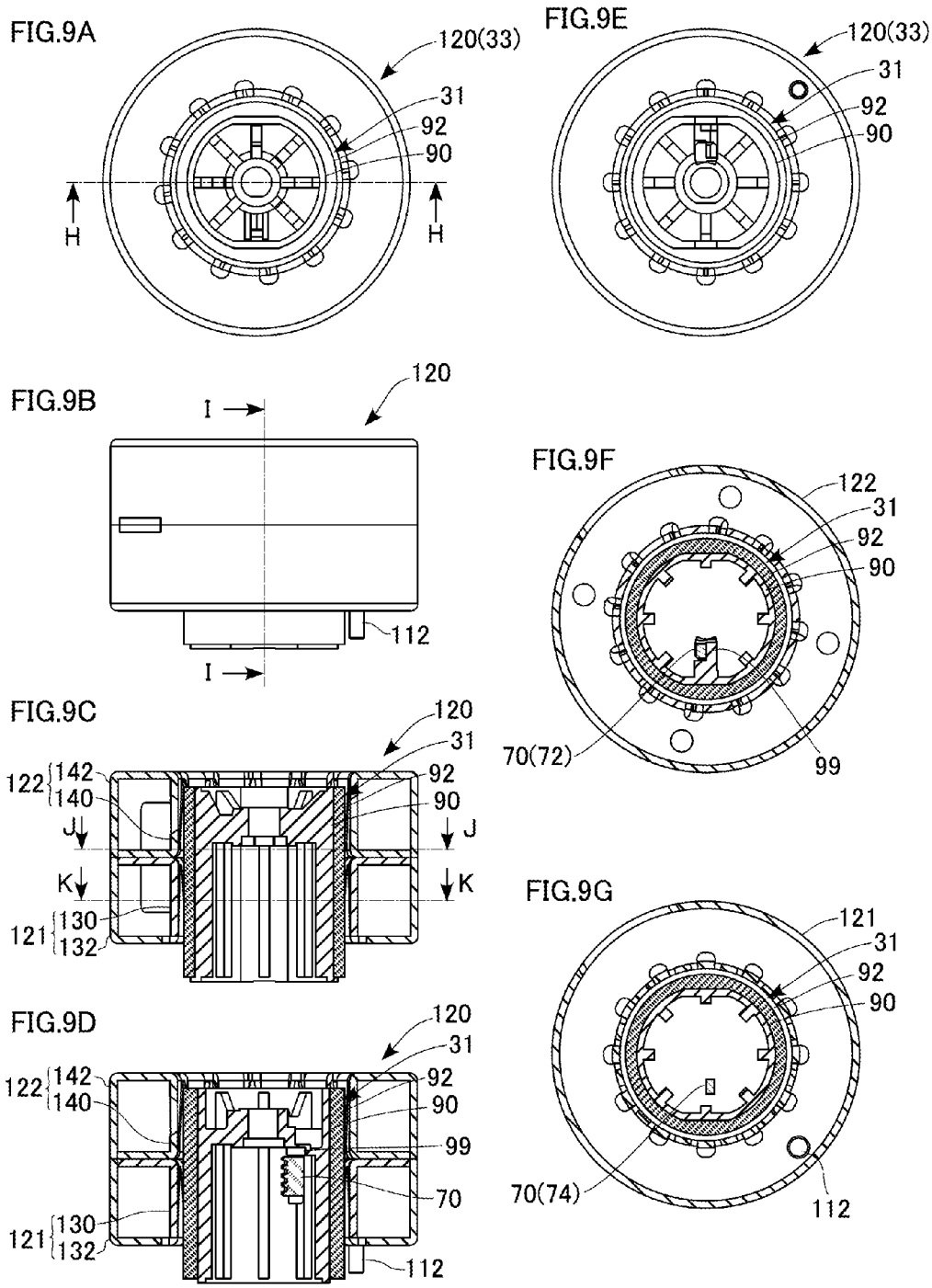

MOTOR OPERATED VALVE

CLAIM OF PRIORITY

This application claims priority to Japanese Patent Application No. 2014-237349, filed on Nov. 25, 2014, and is incorporated herein by reference.

BACKGROUND OF THE INVENTION

1. Field of the Invention

The present invention relates to a motor operated valve driven by a stepping motor.

2. Description of the Related Art

A refrigeration cycle in an automotive air conditioner generally includes a compressor for compressing circulating refrigerant, a condenser for condensing the compressed refrigerant, an expansion valve for throttling and expanding the condensed liquid refrigerant and delivering the resulting spray of gas-liquid mixture refrigerant, and an evaporator for evaporating the misty refrigerant and cooling the air in a vehicle interior by evaporative latent heat. For the expansion valves, mechanical expansion valves have been widely used. Such a mechanical expansion valve senses the temperature and the pressure of refrigerant at an outlet side of the evaporator and autonomously opens and closes a valve section thereof. Alternatively, motor operated valves have also been increasingly used with the recent widespread use of electric vehicles and hybrid vehicles. Motor operate valves achieve accurate control of the valve opening degree by means of stepping motors as drive units.

Such a motor operated valve converts rotational movement of a rotor into translational movement of a shaft to drive a valve element. The valve element is supported by an end of the shaft, and opens and closes the valve section by leaving and touching a valve seat formed in a refrigerant passage. To absorb the impact of the valve element touching the valve seat, the valve element is supported by the shaft in a relatively displaceable manner. Specifically, the shaft has a hollow end portion, and the valve element is partially inserted in the hollow end portion and slidably supported thereby. A spring for biasing the valve element in a valve closing direction, that is, in a direction in which the valve element is made to protrude from the shaft is disposed in an internal space of the shaft. When the valve element touches the valve seat, the spring elastically deforms to absorb the impact.

In order to control the valve opening degree of such a motor operated valve with high accuracy by means of a stepping motor, a reference position is set for defining the rotating position of the rotor. For example, a stator and the rotor are positioned so that the magnetic poles of the stator and those of the rotor are opposite to each other in a valve closed state. With this structure, when power supply is cut off in the valve closed state, the rotor is stopped at the reference position. When power supply is resumed, the valve opening degree is controlled on the basis of the reference position.

One example of valves proposed to achieve such positioning is provided with a fitting structure for positioning between a can, which is part of a motor operated valve, and a bracket attached to a stator (refer to Japanese Patent Application Publication No. 2001-304445, for example). Another example of such valves is provided with a rotation restricting member at a specific position of the stator, and achieves positioning by connecting the rotation restricting member to a pipe connected to a body (refer to Japanese Patent Application Publication No. 2005-90571, for example). These configurations may reduce bounce-back phenomena caused by misalignment of magnetic poles while the valve is being closed, for example, and may achieve stable stop of the rotor at a reference position (refer to Japanese Patent Application Publication No. 2004-357409, for example).

RELATED ART LIST (1) Japanese Patent Application Publication No. 2001-304445

(2) Japanese Patent Application Publication No. 2005-90571

(3) Japanese Patent Application Publication No. 2004-357409

Since, however, the fitting part of the bracket and the connecting part of the rotation restricting member mentioned above are at positions far from the magnetic poles to be positioned, the improvement in the accuracy of positioning of the magnetic poles expected by using these configurations is limited. Furthermore, the fitting part and the connecting part are provided outside of stators, which may be disadvantageous in miniaturization of motor operated valves.

SUMMARY OF THE INVENTION

A purpose of the present invention is to improve the accuracy of positioning a stator with a simple structure in a motor operated valve driven by a stepping motor.

One embodiment of the present invention relates to a motor operated valve driven by a stepping motor. The motor operated valve includes a body having an inlet port through which fluid is introduced from an upstream side, an outlet port through which fluid is delivered to a downstream side, and a valve hole through which the inlet port and the outlet port communicate with each other; a valve element configured to open and close a valve section by moving away from and toward the valve hole; a stepping motor including a rotor for driving the valve element in opening and closing directions of the valve section, and a stator mounted on an end surface of the body, and configured to rotate the rotor; a shaft coaxially connected with the rotor, and configured to transmit a driving force to the valve element; a stopper mechanism for restricting a rotation amount of the shaft; a can fixed to the body, the can being a cylindrical member covering a space in which the valve element, the shaft, and the stopper mechanism are disposed and containing the rotor, the can defining an internal space in which a fluid pressure acts and an external space in which no fluid pressure acts, the stator being coaxially mounted around the can.

Positions of the stator and the rotor in a rotating direction when the shaft is stopped by an operation of the stopper mechanism are set to be reference positions at which magnetic poles of the stator and those of the rotor are opposite to each other. The rotor is configured to be stopped at the reference position by an arrangement of the stopper mechanism. The stator is positioned relative to the body according to a positional relation between a fitting part formed on surfaces of the stator and the body attached to each other and an insertion part where the can is inserted into the stator, and magnetic poles of the stator and magnetic poles of the rotor are opposite to each other at the reference positions.

With this embodiment, the fitting part for positioning of the stator is provided on the surfaces of the stator and the body attached to each other. This eliminates the need for making room for the positioning at a space outside of the stator, and can make the fitting part and the magnetic poles closer to each other. The accuracy of positioning of the stator can therefore be improved with a simple configuration.

BRIEF DESCRIPTION OF THE DRAWINGS

FIGS. 9A to 9G are explanatory views on setting of reference positions of the rotor and the stator coil.

DETAILED DESCRIPTION OF THE INVENTION

Figure 1A:
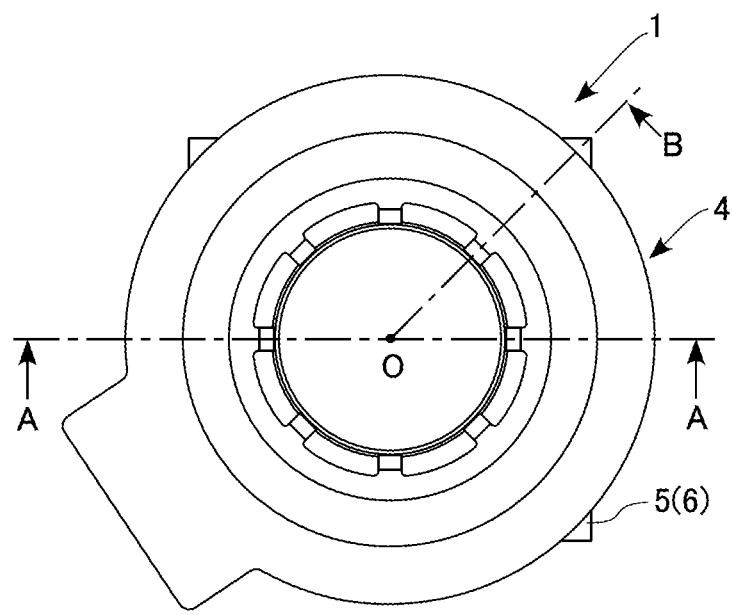
FIGS. 1A and 1B are external views of a control valve according to an embodiment.

The invention will now be described by reference to the preferred embodiments. This does not intend to limit the scope of the present invention, but to exemplify the invention.

Embodiments of the present invention will now be described in detail with reference to the accompanying drawings. In the following description, for convenience of description, the positional relationship in each structure may be expressed with reference to how each structure is depicted in the drawings.

Figure 1B:
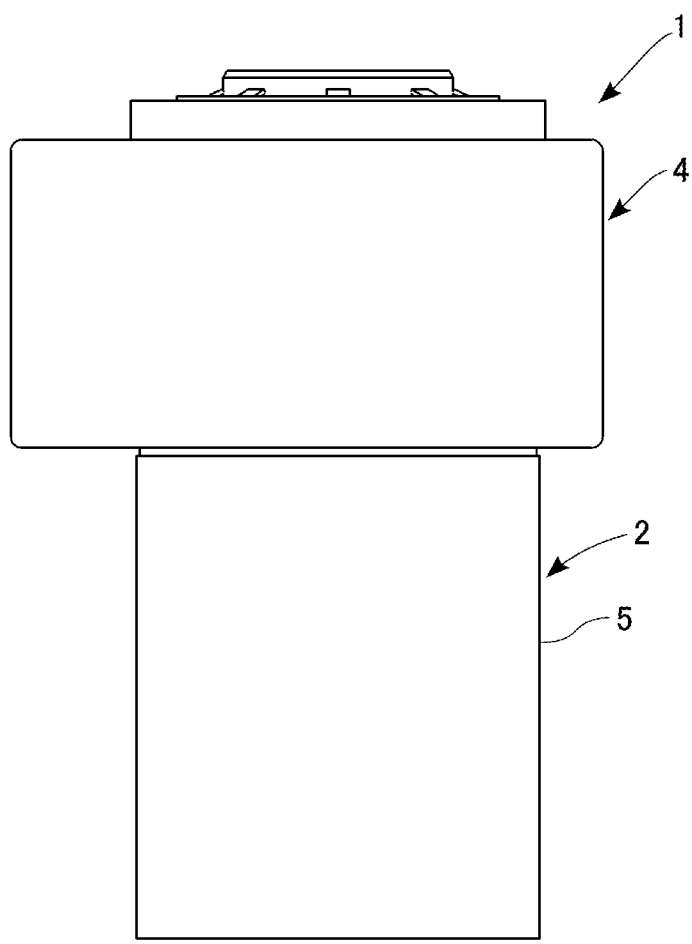
Figure 2:
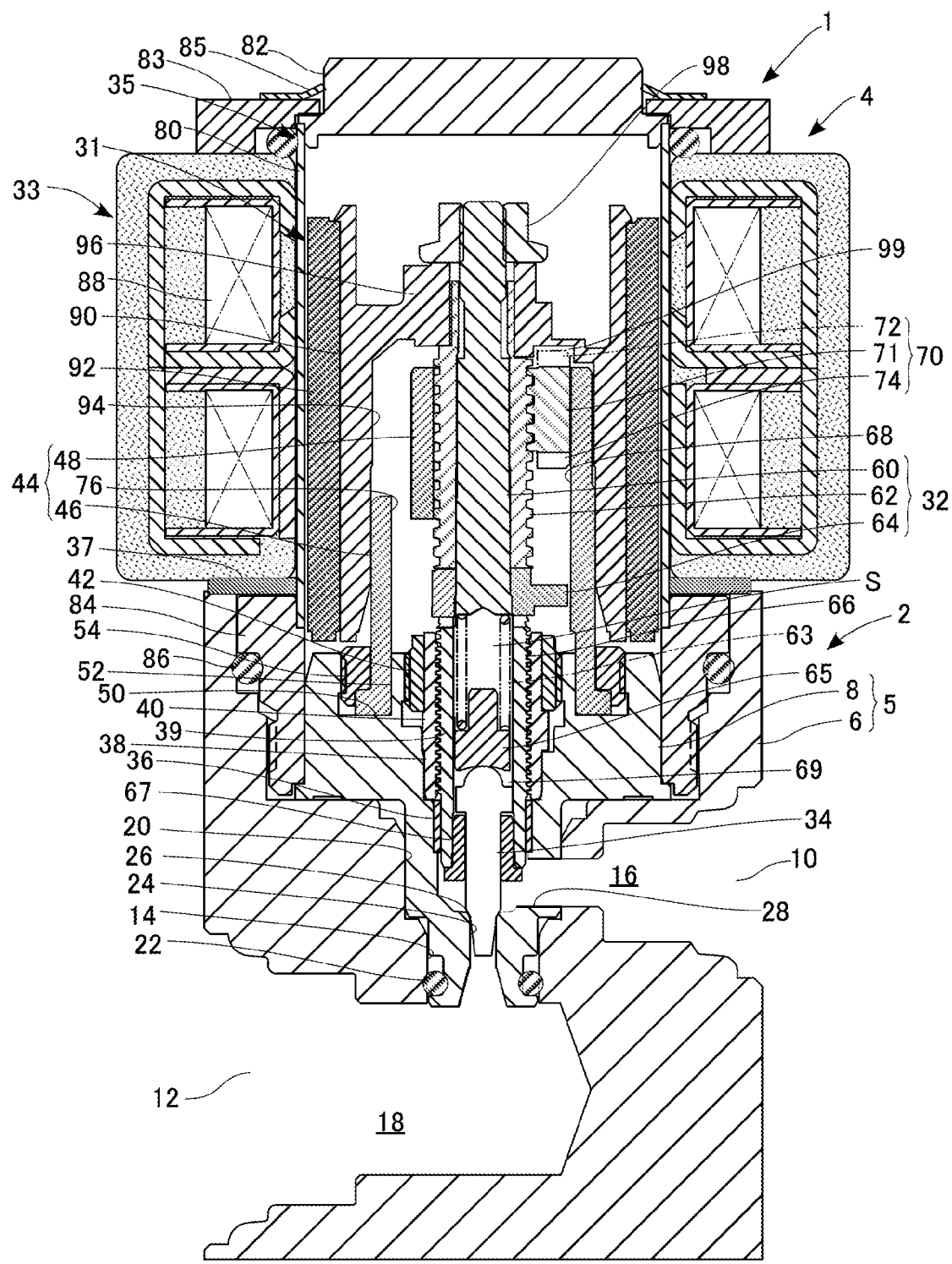
FIG. 2 is a cross-sectional view along arrows A-A in FIG. 1A.

FIGS. 1A and 1B are external views of a control valve according to an embodiment. FIG. 1A is a plan view, and FIG. 1B is a front view. FIG. 2 is a cross-sectional view along arrows A-A in FIG. 1A. The present embodiment embodies a motor operated valve of the present invention in a form of a control valve (expansion valve) applied to a refrigeration cycle in an automotive air conditioner. The refrigeration cycle includes a compressor for compressing circulating refrigerant circulating, a condenser for condensing the compressed refrigerant, an expansion valve for throttling and expanding the condensed liquid refrigerant and delivering the resulting spray of gas-liquid mixture refrigerant, and an evaporator for evaporating the misty refrigerant and cooling the air in a vehicle interior by evaporative latent heat. For convenience of description, the structure of the control valve that is a main component will mainly be described below and detailed description of the other components will be omitted.

As illustrated in FIGS. 1A and 1B, the control valve 1 is a stepping motor driven expansion valve formed by assembly of a valve body 2 and a motor unit 4. The valve body 2 has a body 5 containing a valve section. The motor unit 4 is mounted in such a manner as to close an upper end opening of the body 5.

As illustrated in FIG. 2, the body 5 includes a prismatic first body 6 and a second body 8 having a stepped cylindrical shape mounted in an upper half part of the first body 6. The first body 6 is made of an aluminum alloy, and the second body 8 is made of a copper alloy. In a modification, the second body 8 may be made of stainless steel (hereinafter referred to as "SUS").

An inlet port 10 through which refrigerant is introduced from the upstream side is formed in an upper part of one lateral surface of the first body 6, and an outlet port 12 through which refrigerant is delivered to the downstream side is formed in a lower part of the opposite lateral surface. A vertical connection passage 14 is formed in the middle of the first body 6, a passage 16 upstream thereof communicates with the inlet port 10, and a passage 18 downstream thereof communicates with the outlet port 12. The first body 6 has a mounting hole 20 having a stepped circular hole shape formed therein, the diameter of which increases in a stepwise manner from the bottom to the top. The connection passage 14 constitutes part of the mounting hole 20.

The second body 8 has a stepped cylindrical shape whose outer diameter and inner diameter decrease in a stepwise manner from the top to the bottom, and an external shape complementary to the shape of the mounting hole 20. The second body 8 is mounted in such a manner as to be fitted into the mounting hole 20 from above the first body 6. An O-ring 22 for sealing is disposed between the first body 6 and the second body 8 at a position of the connection passage 14.

A valve hole 24 is formed in a lower end portion of the second body 8, and a valve seat 26 is formed at an upper end opening of the valve hole 24. A communicating hole 28 connecting the inside and the outside of the second body 8 is formed through the surface of the second body 8 facing the inlet port 10. The valve hole 24 communicates with the upstream passage 16 through the communicating hole 28.

An actuating rod 32 (main shaft) extending from a rotor 31 of the motor unit 4 coaxially therewith is inserted inside the second body 8. The actuating rod 32 supports a needle-like valve element 34 at an end portion (lower end portion) thereof. The valve element 34 touches and leaves the valve seat 26 from the upstream side to close and open the valve section.

A cylindrical sliding bearing 36 is press-fitted in a middle portion in the axial direction of the second body 8, and a cylindrical guide member 38 is press-fitted in a portion immediately above the middle portion. In the present embodiment, a plastic bearing reinforced with a cylindrical metal mesh core is used as the sliding bearing 36. The sliding bearing 36 is an oilless bearing (self-lubricating bearing) using polytetrafluoroethylene (hereinafter referred to as "PTFE") as a plastic material. The sliding bearing 36 is subjected to sizing, which improves the dimensional accuracy of the inner diameter and the coaxiality with the second body 8. This development enables the sliding bearing 36 to maintain low friction and high abrasion resistance, and also to increase the load bearing capacity. In a modification, a steel plate may be used as the core instead of metal mesh.

An internal thread 39 (functioning as an "internal threaded portion") is formed on an inner surface of the guide member 38. The guide member 38 is produced by forming the internal thread 39 through cutting on an inner surface of a tubular material made of SUS. In the present embodiment, the internal thread 39 is constituted by a trapezoidal thread with high thrust and excellent abrasion resistance. In a modification, the internal thread 39 may be constituted by a triangular thread. A flange part 40 protruding radially outward is formed at the middle in the axial direction of the guide member 38. The bottom surface of the flange part 40 is stopped by a stepped portion of the second body 8, so that the amount by which the guide member 38 is press-fitted to the second body 8 is controlled. More specifically, the guide member 38 is lightly press-fitted into the second body 8, and fixed in such a manner that the guide member 38 is pressed from above by a ring thread 42 with a small diameter screwed in an upper end of the second body 8. In a modification, the guide member 38 may be fixed in the second body 8 only by press-fitting.

A rack guide 44 is disposed upright on a top surface of the second body 8. The rack guide 44 has a lower half part constituting a large diameter part 46, an upper half part constituting a small diameter part 48, and a lower end portion fixed to the top surface of the second body 8. More specifically, a lower end portion of the rack guide 44 is fit around a circular boss part 52 produced by forming an annular fitting groove 50 in the top surface of the second body 8. The rack guide 44 is fixed in such a manner that the lower end portion thereof is pressed from above by a ring thread 54 having a large diameter screwed in the upper end of the second body 8. In a modification, the rack guide 44 may be fixed in the second body 8 by press-fitting or swaging.

In the present embodiment, since the second body 8 is formed by cutting using a lathe, the valve hole 24, a fitting hole in the portion into which the sliding bearing 36 is press-fitted, a fitting hole in the portion into which the guide member 38 is press-fitted, and the circular boss part 52 are coaxial. The sliding bearing 36, the guide member 38, and the rack guide 44 thus have high coaxiality with the valve hole 24. The sliding bearing 36 functions as a "support part" supporting a lower end portion of a shaft 60.

The actuating rod 32 is formed by assembly of the shaft 60, a worm 62, and a stopper 64. The shaft 60 is produced by cutting a rod material made of SUS, has a cylindrical lower half part with a large diameter, and has an external thread 66 formed on an outer surface of the lower half part. In the present embodiment, the external thread 66 is constituted by a trapezoidal thread with high thrust and excellent abrasion resistance. In a modification, the external thread 66 may be constituted by a triangular thread. The external thread 66 is screwed with the internal thread 39 of the guide member 38. Thus, the lower half part of the shaft 60 functions as an "external threaded portion". In the present embodiment, the external thread 66 and the internal thread 39 are subjected to diamond-like carbon (DLC) coating, so that the load bearing capacities thereof are increased. In a modification, surface treatment excellent in load bearing capacity, abrasion resistance and sliding friction reduction may be employed instead of the DLC coating. Alternatively, precipitation hardening stainless steel may be used.

The stopper 64 and the worm 62 are disposed around an upper half part of the shaft 60. The upper half part of the shaft 60 has a non-circular cross-section, and the stopper 64 and the worm 62 have through-holes of the same shape. This prevents the stopper 64 and the worm 62 from being displaced relative to each other after being fitted around the shaft 60. The stopper 64 is held between the lower half part of the shaft 60 and the worm 62.

The lower half part of the shaft 60 has a hollow structure in which an internal space S that is open downward (that is, at a leading end of the shaft 60) is formed. The internal space S contains a spring 63 (functioning as a "biasing member"), a spring holder 65, and the valve element 34 in this order from the top. The lower half part of the shaft 60 thus functions as an "accommodation part" accommodating these components. A cylindrical bush 67 (press-fitted bush) is concentrically press-fitted into the lower end opening of the shaft 60, and slidably supports the valve element 34 from below. The valve element 34 is made of SUS, and the spring holder 65 and the bush 67 are made of a copper alloy. Since the shaft 60 and the bush 67 are integrated, the shaft 60 and the bush 67 can collectively be regarded as a "shaft" in a broad sense. A lower end opening of the bush 67 constitutes a "leading end opening" of the shaft.

The valve element 34 is disposed through the bush 67, and has a flange part 69 protruding radially outward from an upper end portion thereof. A bottom surface of the flange part 69 is stopped by a top surface of the bush 67, so that the valve element 34 is prevented from dropping off downward. The spring holder 65 transmits downward biasing force (in a valve closing direction) of the spring 63 to the valve element 34. The upper end of the valve element 34 has a hemispherical curved surface in point contact with a bottom surface of the spring holder 65. With this configuration, even when the spring holder 65 is tilted to a certain degree, the movement of the valve element 34 along the axial direction will not be affected. The valve element 34 rotates integrally with the bush 67 and the spring holder 65 while the valve element 34 is not in contact with the valve seat 26. The rotation of the valve element 34, however, is restricted while the valve element 34 is in contact with the valve seat 26. The curved surface shape of the valve element 34 prevents or reduces friction between the valve element 34 and the spring holder 65 in such a state.

One portion in the circumference direction of the small diameter part 48 of the rack guide 44 is recessed radially outward, and forms a flat guide portion 68 extending in the vertical direction with a predetermined width. The guide portion 68 extends parallel to the axis of the worm 62 and contains a small piece of rack 70. The rack 70 has a prismatic body 71. The body 71 has a rectangular cross-section that is complementary to the shape of the guide portion 68, and has an inner surface that is engaged with the worm 62. The rack 70 is guided by the guide portion 68 with the rotation of the worm 62 to make translational movement in the vertical direction. A stopper 72 for stopping the rack 70 at the top dead center protrudes from a top surface of the body 71, and a stopper 74 for stopping the rack 70 at the bottom dead center protrudes from a bottom surface thereof. Since the stopper 72 is actually positioned on the front side of the illustrated cross-section, the stopper 72 is depicted by a two-dot chain line (imaginary line). The large diameter part 46 is inserted in a lower end portion of the rotor 31 with a small clearance therebetween. The clearance has such a size that can prevent whirling of the rotor 31.

The motor unit 4 is a stepping motor including the rotor 31 and a stator coil 33. The motor unit 4 includes a can 35 having a bottomed cylindrical shape, the rotor 31 is disposed inside the can 35, and the stator coil 33 is disposed outside the can 35. The can 35 is a cylindrical member covering a space in which the valve element 34 and a mechanism for driving the valve element 34 are disposed and containing the rotor 31, and defines an internal pressure acting space (internal space) in which the pressure of the refrigerant acts and an external non pressure acting space (external space) in which the pressure of the refrigerant does not act.

The can 35 includes a nonmagnetic, cylindrical body 80, disc-shaped end member 82 that closes an upper end opening of the body 80, and an annular connecting member 84 that is coupled to a lower end of the body 80. The connecting member 84 has a lower end portion with an external thread formed thereon, and also functions as a ring thread. An upper end portion of the first body 6 has an internal thread formed thereon that can be engaged with the external thread. The motor unit 4 can be secured to the body 5 by engaging and tightening the connecting member 84 with the first body 6. As illustrated, the connecting member 84 is mounted around an upper half part of the second body 8. An O-ring 86 for sealing is disposed between the upper end portion of the first body 6 and the connecting member 84 to prevent refrigerant introduced through the inlet port 10 from passing between the can 35 and the body 5 and leaking outside. In a modification, the can 35 (connecting member 84) may be fixed in the first body 6 by press-fitting, swaging, welding, or the like.

The stator coil 33 is formed into a cylindrical shape by plastic molding of an exciting coil 88, and coaxially disposed around (inserted around/outserted around) the can 35. The stator coil 33 is secured to the body 5 with a packing 37 that is a sealing member therebetween. The stator coil 33 is secured to the body 5 by being pressed by an annular pressing member 83 from above. A plate spring 85 is disposed between the pressing member 83 and the end member 82, and applies a biasing force to the pressing member 83. Alternatively, the connection of the stator coil 33 to the body 5 can be obtained by screwing, welding, brazing, or swaging, for example. Since the stator coil 33 is disposed in the atmosphere that is not affected by the pressure of the refrigerant, such a securing strength at which the stator coil 33 can withstand vibration under an environment in which the control valve 1 is applied, such as an in-vehicle environment, will be sufficient, which need not be as strong as that for the can 35 required to be secured in a pressure-resistant manner.

The rotor 31 includes a cylindrical rotor core 90 coaxial with the shaft 60, and a magnet 92 disposed along the circumference of the rotor core 90. In the present embodiment, the magnet 92 is magnetized with a plurality of poles (24 poles in the present embodiment) in the circumferential direction. An internal space over substantially the entire length of the rotor core 90 is formed inside the rotor core 90. Guide portions 94 extending parallel to the axis of the rotor core 90 are formed at 45-degree intervals in the circumferential direction on an inner surface of the rotor core 90. The guide portions 94 are constituted by elongated protrusions (ribs) extending parallel to the axis.

Upper end portions of the guide portions 94 extend radially inward and connected at a cylindrical shaft 96. This cylindrical shaft 96 is coaxially fixed to an upper end portion of the actuating rod 32. The fixing is achieved by fitting the cylindrical shaft 96 into the upper end portion of the actuating rod 32 and screwing a nut 98. A stopper 99 is provided at a predetermined position of the cylindrical shaft 96 to define the top dead center of the rack 70.

With the configuration as described above, the actuating rod 32, which is a rotational shaft of the rotor 31, is supported at two points by the small diameter part 48 of the rack guide 44 and the sliding bearing 36. Furthermore, the clearance between the large diameter part 46 of the rack guide 44 and the guide portions 94 is set so that the runout of the rotor 31 can be restricted. Thus, when the control valve 1 is mounted in a vehicle, the rotor 31 is less likely to be affected by vibration and can stably rotate about the axis. Although the actuating rod 32 is rotatably supported by the rack guide 44 at the position of the worm 62, no problem of friction will be caused therebetween since both the worm 62 and the rack guide 44 are made of self-lubricating plastic materials.

The rack 70 makes translational movement in the vertical direction with the rotation of the rotor 31. When the rack 70 moves upward with the rotation of the rotor 31 in one direction and reaches a preset top dead center, the rack 70 and the stopper 99 stop each other to restrict the rotation of the shaft 60. As a result, downward displacement of the shaft 60 (in the valve closing direction) is restricted. Conversely, when the rack 70 moves downward with the rotation of the rotor 31 in the other direction (in the opposite direction) and reaches a preset bottom dead center, the rack 70 and the stopper 64 stop each other to restrict the rotation of the shaft 60. As a result, upward displacement of the shaft 60 (in the valve opening direction) is restricted. Thus, in the present embodiment, the stopper 99 functions as a "first stopper", and the stopper 64 functions as a "second stopper". In addition, the worm 62, the rack 70, the stopper 64, and the stopper 99 function as a "stopper mechanism" for restricting the rotation amounts of the shaft 60 in one direction and in the other direction.

Figure 3:
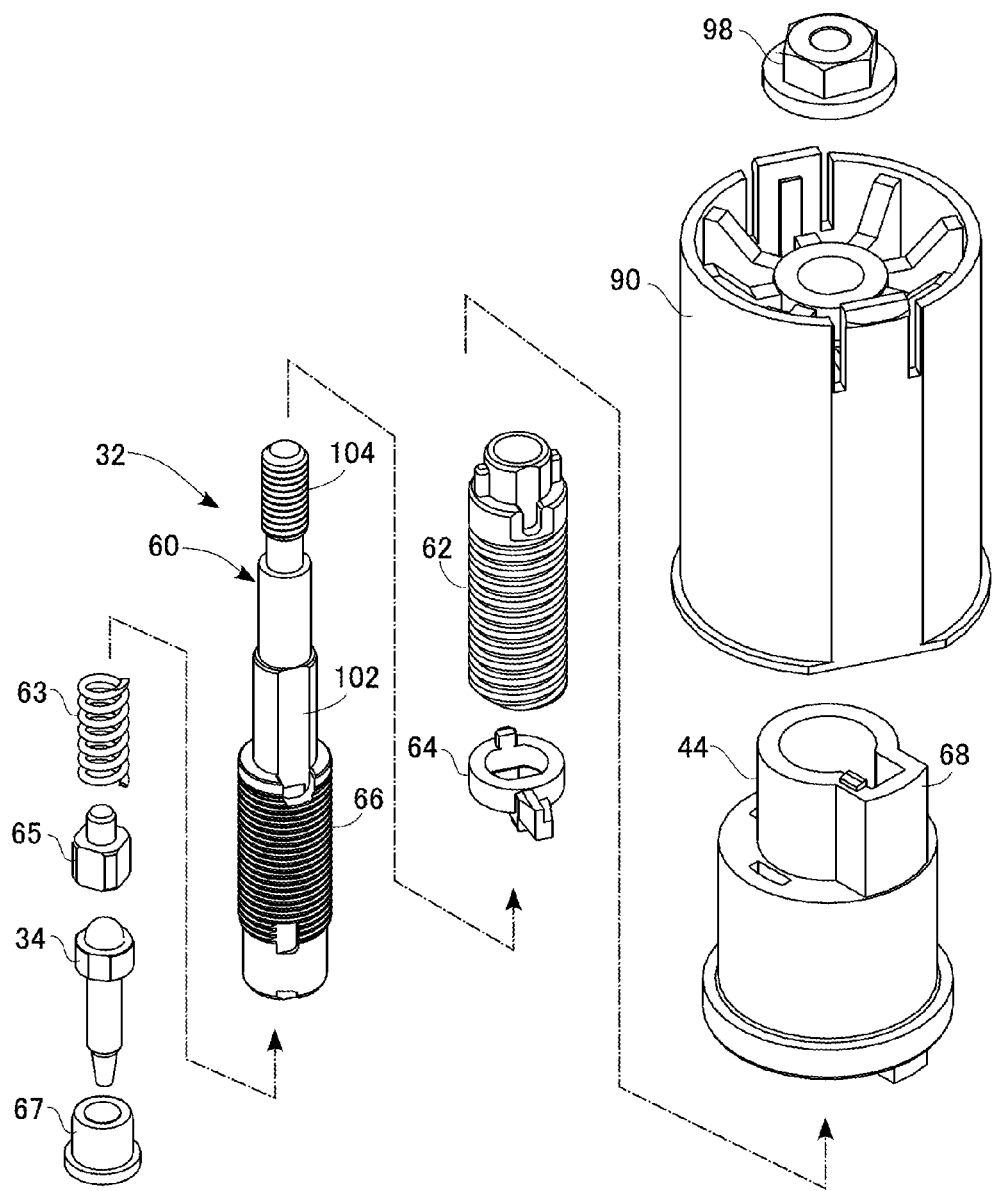
FIG. 3 is an exploded perspective view illustrating components of a rotor and an actuating rod.

FIG. 3 is an exploded perspective view illustrating components of the rotor 31 and the actuating rod 32. The shaft 60 has a stepped cylindrical external shape whose diameter decreases in a stepwise manner from the bottom to the top. A fitting portion 102 having a noncircular cross-section (a so-called D-cut structure) is formed immediately above the external thread 66 of the shaft 60. An external thread 104 is formed on an upper end portion of the shaft 60. The spring 63, the spring holder 65, and the valve element 34 are inserted in this order through the lower end opening of the shaft 60, the bush 67 is press-fitted so that these components are held inside the shaft 60.

The actuating rod 32 is assembled by mounting the stopper 64 and the worm 62 in this order from the top of the shaft 60 so that the actuating rod 32 extends therethrough. The stopper 64 and the worm 62 are individually produced by injection molding a plastic material (glass-fiber reinforced plastic) such as polyphenylene sulfide (hereinafter referred to as "PPS") containing glass fiber, and have insertion holes having shapes complementary to the shape of the fitting portion 102. The stopper 64 and the worm 62 are thus positioned concurrently with the mounting on the shaft 60, which prevents slippage after the assembly.

In assembly of the control valve 1, the sliding bearing 36 and the guide member 38 are mounted in this order in the second body 8 and fixed by the ring thread 42 as illustrated in FIG. 2. In this state, the actuating rod 32 assembled as described above is screwed with the guide member 38 so that the actuating rod 32 is coaxially mounted. Subsequently, in a state in which the rack 70 is engaged with the worm 62, the rack guide 44 is mounted from above. In this process, the lower end portion of the rack guide 44 is fit to the circular boss part 52 while the rack 70 is positioned to be contained in the guide portion 68, and secured to the second body 8 by the ring thread 54. In this state, the rotor core 90 is mounted around the rack guide 44, and the nut 98 is screwed onto the external thread 104 protruding from the rotor core 90 to fix the rotor 31 to the actuating rod 32. In a modification, the rotor core 90 and the shaft 60 may be fixed by connection using a retaining ring or a push nut.

The control valve 1 having the configuration as described above functions as a stepping motor operated expansion valve whose valve opening degree can be adjusted by drive control of the motor unit 4. Specifically, in flow rate control using the control valve 1, a non-illustrated controller of an automotive air conditioner computes the number of driving steps of the stepping motor according to a preset opening degree, and supplies a drive current (drive pulse) to the exciting coil 88. This causes the rotor 31 to rotate, and the shaft 60 also rotates therewith. In this process, the shaft 60 makes a translational movement in the vertical direction, that is, in the opening and closing directions of the valve section by a screw mechanism between the shaft 60 and the guide member 38 to adjust the opening degree of the valve section to the preset opening degree. The screw mechanism thus functions as a "motion converting mechanism" that drives the valve element 34 in the opening and closing directions of the valve section by converting rotational movement of the rotor 31 about the axis into translational movement (linear movement) of the shaft 60 (actuating rod 32) in the axial direction.

Specifically, when the rotor 31 is rotated in one direction (normal rotation) from the valve closed state of the control valve 1 illustrated in FIG. 2, the valve element 34 turns into a valve opening state. More specifically, the shaft 60 rotating with the rotor 31 moves upward by the screw mechanism, and the bush 67 displaces the valve element 34 in the valve opening direction in such a manner that the bush 67 pulls the valve element 34 upward. In this process, the rack 70 makes a translational movement in a direction (that is, downward) opposite to the worm 62 moving upward integrally with the shaft 60. As the rotor 31 is rotated in one direction, the opening degree of the valve section increases. When the rack 70 reaches the bottom dead center, the stopper 64 and thus the rotation of the rotor 31 are stopped, and the valve element 34 is stopped at a valve fully open position.

When the rotor 31 is rotated in the other direction (opposite direction) (reverse rotation), the opening degree of the valve section decreases. More specifically, the shaft 60 reversely rotating with the rotor 31 moves downward by the screw mechanism, and the valve element 34 is displaced in the valve closing direction in a state supported by the bush 67. In this process, since the biasing force of the spring 63 is transmitted to the valve element 34 via the spring holder 65, the valve element 34 is stably displaced integrally with the bush 67. In this process, the rack 70 makes a translational movement in the direction (that is, upward) opposite to the worm 62 moving downward integrally with the shaft 60. As a result, when the rack 70 reaches the top dead center as illustrated in FIG. 2, the stopper 99 and thus the rotation of the rotor 31 are stopped, and the valve element 34 is stopped at a valve closed position. Since the valve element 34 is disengaged from the bush 67 at the same time as seating on the valve seat 26, no excessive pressing force will act between the valve element 34 and the valve seat 26.

As described above, the shaft 60 and the rack 70 are configured to make translational movements opposite to each other along the axial direction according to the rotation of the rotor 31, and the rack 70 is displaced to be contained in the internal space of the rotor 31. This minimizes the translational stroke in the axial direction of the whole internal mechanism of the control valve 1, and the control valve 1 can be made compact.

Since the number of rotations of the rotor 31 corresponds to the number of driving steps that is a control command value, the not-illustrated controller can control the control valve 1 at any opening degree. In the present embodiment, the valve element 34 makes a stroke of 0.5 mm per one rotation of the rotor 31.

In the present embodiment, the screw mechanism between the shaft 60 and the guide member 38 has a lead angle set so as to be in a so-called self-locked state when power supply to the stator coil 33 is cut off in a state in which the magnetic poles (pole teeth, which will be described later) of the stator coil 33 and those of the rotor 31 are opposite to each other. The self-locking prevents the shaft 60 from rotating by being pushed back by the biasing force of the spring 63, and is achieved by forces acting on tooth surfaces of the guide member 38 and the internal thread 39 engaged with each other. The magnitudes of the forces acting on the tooth surfaces are known to vary depending on the lead angle. In the present embodiment, the lead angle of the screw mechanism is set to a small angle so as to cause such self-locking.

A command signal based on the valve opening degree computed on the basis of the temperature at the outlet of the evaporator or other parameters is input to the control valve 1. The control valve 1 controls the valve opening degree according to the command signal. Liquid refrigerant introduced into the control valve 1 from the condenser side through the inlet port 10 is throttled and expanded (adiabatically expanded) to become a spray of gas-liquid mixture refrigerant as the refrigerant passes through the valve section, and delivered through the outlet port 12 toward the evaporator.

Next, a main configuration of the present embodiment will be described in detail.

Figure 4:
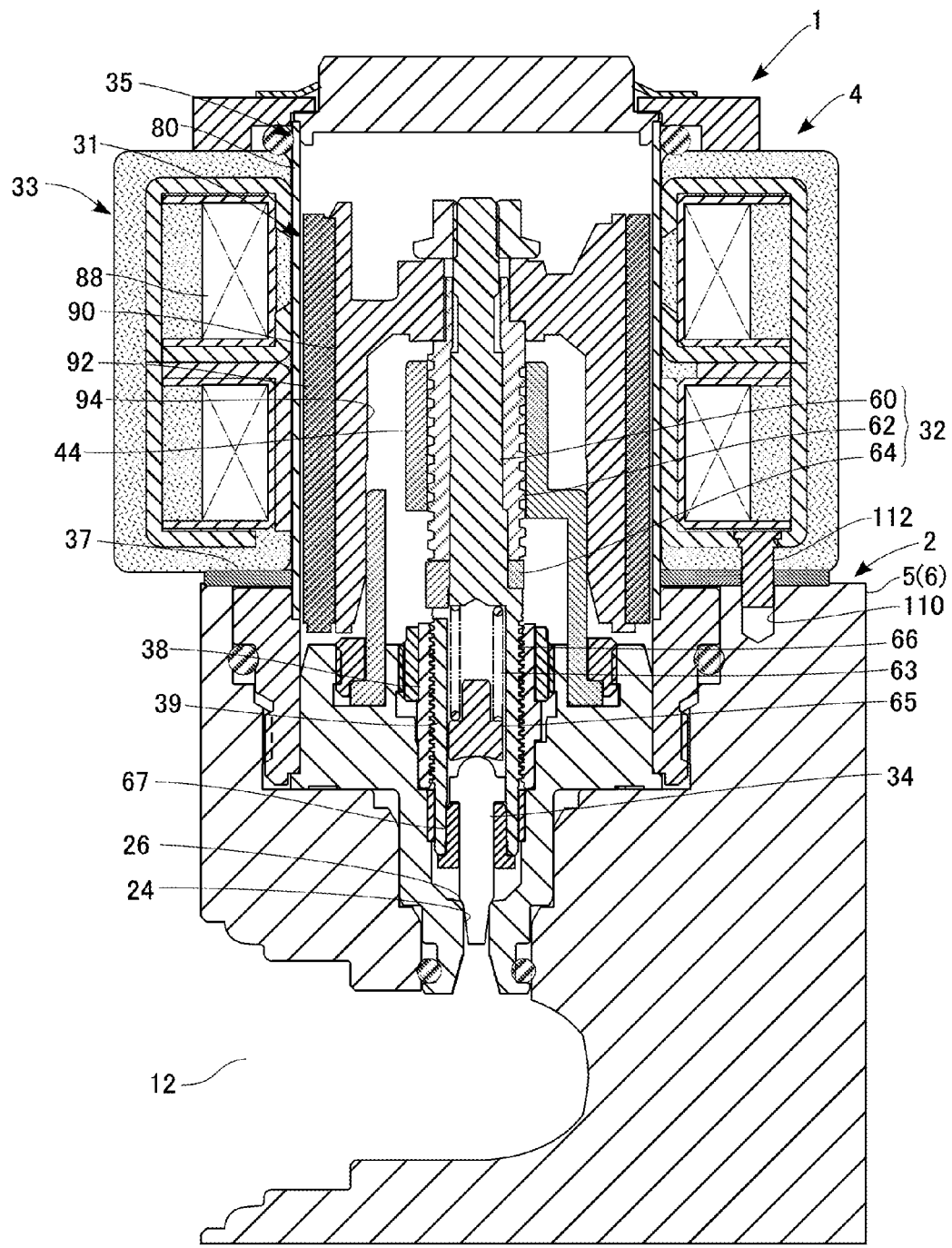
FIG. 4 is a cross-sectional view along arrows A-O-B in FIG. 1A.

FIG. 4 is a cross-sectional view along arrows A-O-B. In the present embodiment, in order to control the valve opening degree with high accuracy by the motor unit 4, reference positions, relative to the body 5, according to which the stator coil 33 and the rotor 31 are positioned are set (the reference positions respectively define points of origin for positioning of the stator coil 33 and the rotor 31). Specifically, the reference positions are set so that the relative positions in the rotating direction of the rotor 31 and the stator coil 33 when the shaft 60 is stopped by the operation of the stopper mechanism are such positions where the magnetic poles of the stator coil 33 and those of the rotor 31 are opposite to each other. That is, the stator coil 33 and the rotor 31 are positioned such that the magnetic poles of the stator coil 33 and those of the rotor 31 are opposite to each other in the valve closed state. As a result, the rotor 31 is configured to stably stop at the reference position when power supply is cut off while the valve is being closed. To achieve this configuration, the rotor 31 is designed to be stopped at the reference position by the arrangement of the stopper mechanism. The stator coil 33 is positioned and disposed so that the magnetic poles thereof and those of the rotor 31 are opposite to each other at the reference positions.

Specifically, as illustrated, a fitting hole 110 is provided at a specific position in an upper end surface of the body 5 (first body 6), and a pin 112 protrudes from a lower end surface of the stator coil 33 facing the upper end surface of the body 5. The pin 112 and the fitting hole 110 constitute a "fitting part". The fitting hole 110 is formed on a diagonal line of the upper end surface of the first body 6 (see FIG. 1A). The provision of the fitting part thus makes effective use of an unused space near a corner of the prismatic first body 6. Since the pin 112 and the fitting hole 110 are provided on the surfaces of the body 5 and the stator coil 33 facing each other, there is no need for making room for the fitting part alone. This configuration contributes to miniaturization of the control valve 1.

Figure 5A:
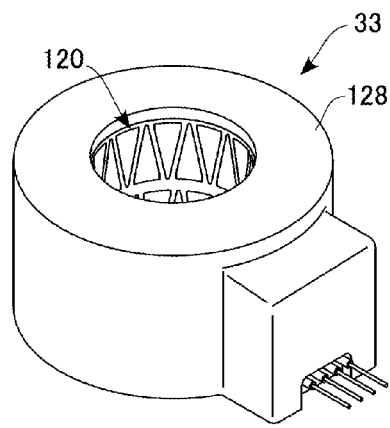
FIGS. 5A to 5F are detailed views of a configuration of a stator coil.
Figure 5D:
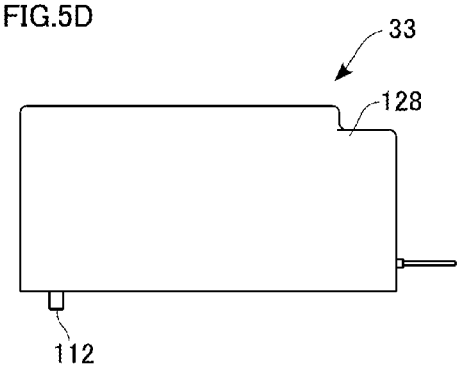
Figure 5B:
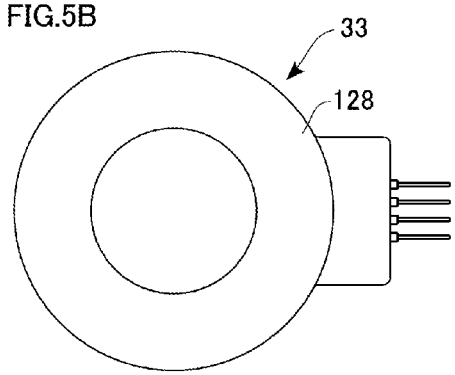
Figure 5E:
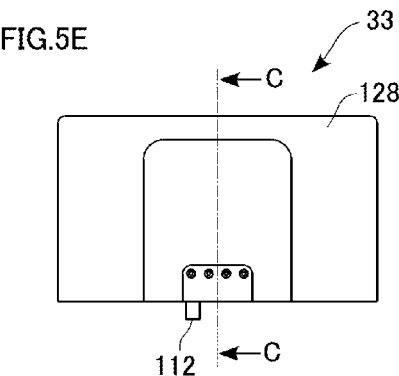
Figure 5C:
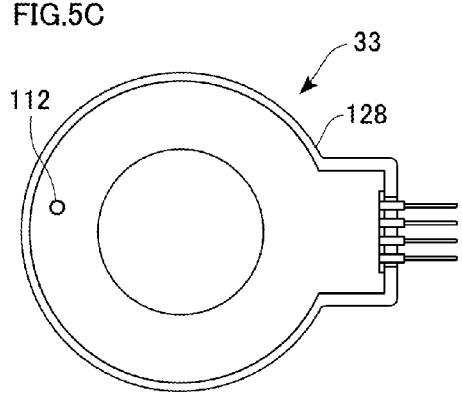
Figure 5F:
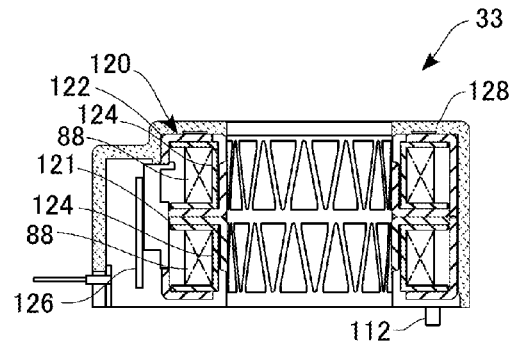
Figure 6A:
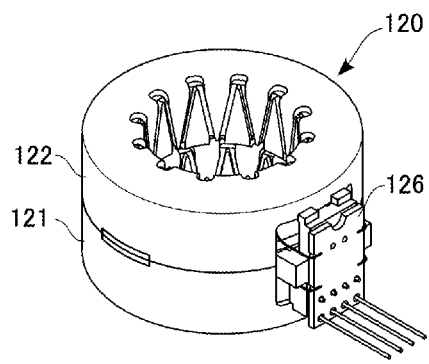
FIGS. 6A to 6F are views of a configuration of the stator coil before plastic molding.
Figure 6D:
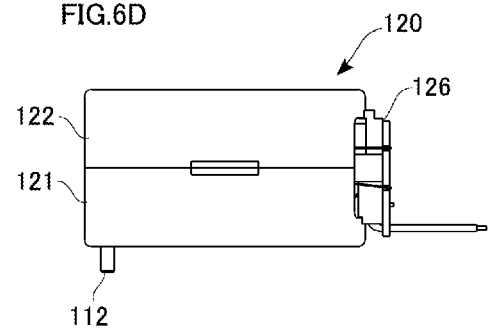
Figure 6B:
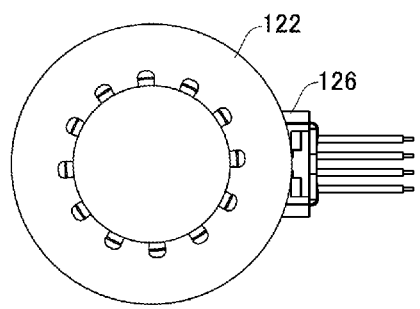
Figure 6E:
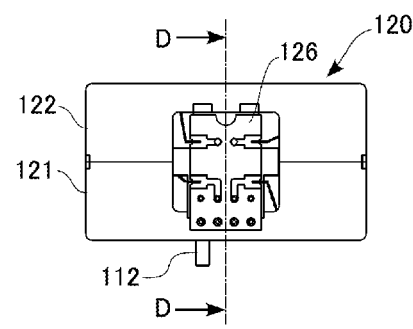
Figure 6C:
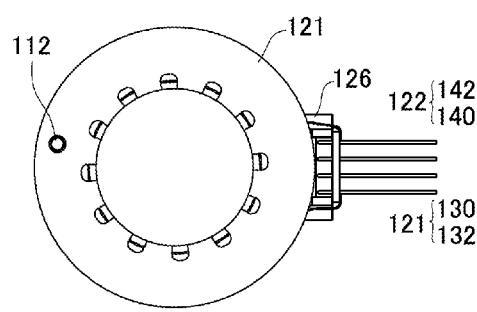
Figure 6F:
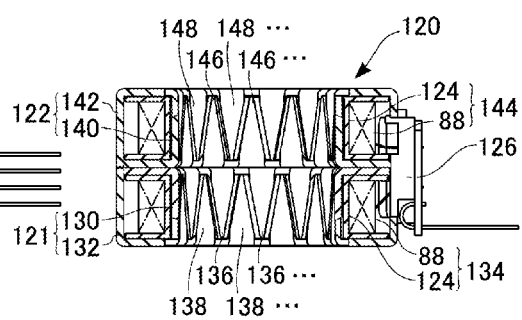

FIGS. 5A to 5F are detailed views of the configuration of the stator coil 33. FIG. 5A is a perspective view as viewed from above, FIG. 5B is a plan view, and FIG. 5C is a bottom view. FIG. 5D is a front view, and FIG. 5E is a side view. FIG. 5F is a cross-sectional view along arrows C-C in FIG. 5E. FIGS. 6A to 6F are views illustrating the configuration of the stator coil 33 before plastic molding. FIG. 6A is a perspective view as viewed from above, FIG. 6B is a plan view, and FIG. 6C is a bottom view. FIG. 6D is a front view, and FIG. 6E is a side view. FIG. 6F is a cross-sectional view along arrows D-D in FIG. 6E.

As illustrated in FIGS. 5A to 5F, the stator coil 33 includes a yoke unit 120 formed by assembly of two yokes (first yoke 121 and second yoke 122) along the axial direction, bobbins 124 mounted on the respective yokes, the exciting coil 88 wound around the bobbins 124, a terminal block 126 holding a terminal to which the exciting coil 88 is connected, and a molded part 128 in which these components are inserted and protected from outside. The terminal block 126 is disposed on lateral surfaces of the yokes, and the external side thereof is covered and thus protected by the molded part 128. The pin 112 is formed to protrude downward from a lower end surface of the first yoke 121.

As illustrated in FIGS. 6A to 6F, the first yoke 121 includes an inner yoke 130 and an outer yoke 132, and houses a first coil unit 134 therebetween. The first coil unit 134 includes the bobbin 124 and the exciting coil 88 wound therearound. The inner yoke 130 has a plurality of pole teeth 136 arranged at regular intervals in the circumferential direction on an inner circumference of an annular body thereof. The outer yoke 132 has a plurality of pole teeth 138 arranged at regular intervals in the circumferential direction on an inner circumference of a bottom portion of a bottomed cylindrical body thereof. The pole teeth are formed by cutting and raising inner end portions of the yokes in the axial direction like comb teeth. The inner yoke 130 and the outer yoke 132 are assembled in such a manner that the pole teeth thereof are alternately engaged. The total number of pole teeth of the yokes is equal to the number of magnetic poles (24 poles) of the magnet 92. The bobbin 124 is mounted on the first yoke 121 in such a manner that the pole teeth are inserted therein.

The second yoke 122 includes an inner yoke 140 and an outer yoke 142, and houses a second coil unit 144 therebetween. The second coil unit 144 includes the bobbin 124 and the exciting coil 88 wound therearound. The inner yoke 140 has a plurality of pole teeth 146 arranged at regular intervals in the circumferential direction on an inner circumference of an annular body thereof. The outer yoke 142 has a plurality of pole teeth 148 arranged at regular intervals in the circumferential direction on an inner circumference of a bottom portion of a bottomed cylindrical body thereof. The pole teeth are formed by cutting and raising inner end portions of the yokes in the axial direction like comb teeth. The inner yoke 140 and the outer yoke 142 are assembled in such a manner that the pole teeth thereof are alternately engaged. The total number of pole teeth of the yokes is equal to the number of magnetic poles (24 poles) of the magnet 92. The bobbin 124 is mounted on the second yoke 122 in such a manner that the pole teeth are inserted therein.

The exciting coil 88 of the first yoke 121 is a first phase coil. The exciting coil 88 of the second yoke 122 is a second phase coil. The rotation of the stepping motor is controlled by sequentially switching between one-phase excitation in which either one of the coils is exited and two-phase excitation in which both coils are excited.

Figure 7A:
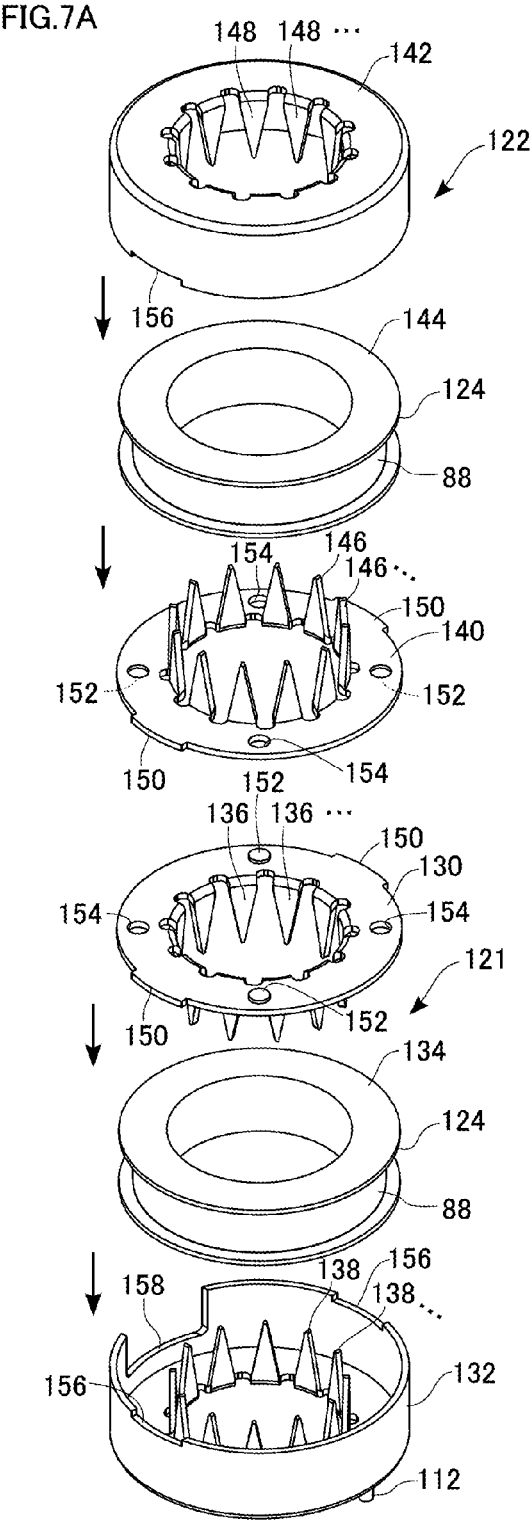
FIGS. 7A and 7B are exploded perspective views illustrating configurations of a yoke and a coil unit.
Figure 7B:
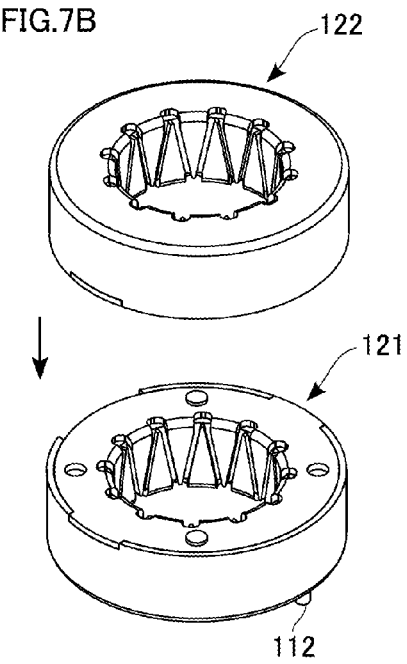
Figure 8A:
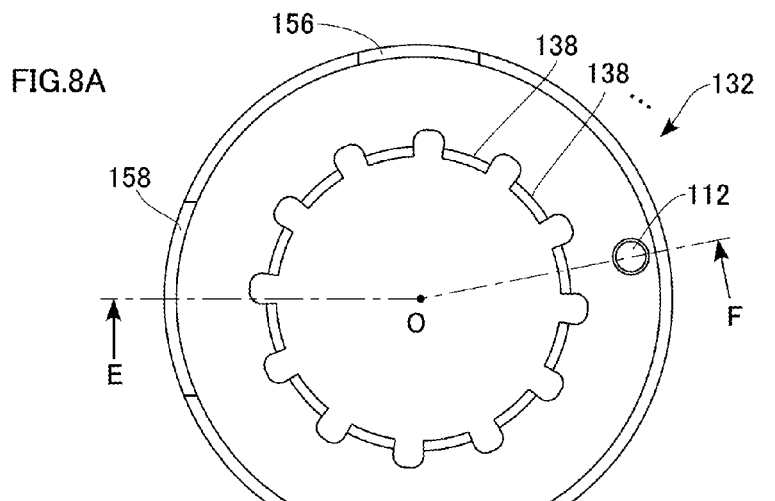
FIGS. 8A to 8D are detailed views illustrating a configuration of an outer yoke of a first yoke.
Figure 8B:
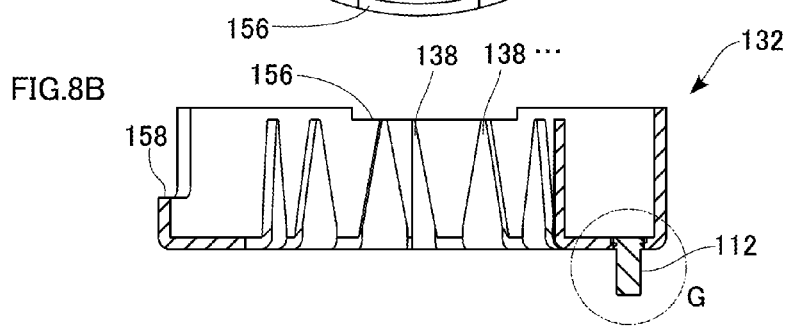
Figure 8C:
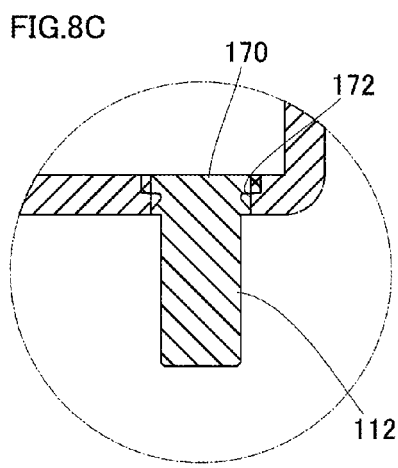
Figure 8D:
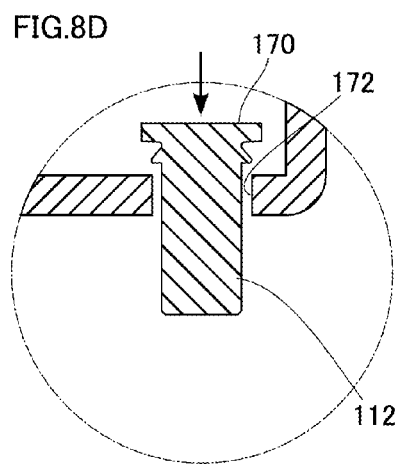

FIGS. 7A and 7B are exploded perspective views illustrating the configurations of a yoke and a coil unit. FIG. 7A illustrates a state in which the inner yoke and the outer yoke are disassembled, and FIG. 7B illustrates a state in which the inner yoke and the outer yoke are assembled. FIGS. 8A to 8D are detailed views illustrating the configuration of the outer yoke 132 of the first yoke 121. FIG. 8A is a plan view, and FIG. 8B is a cross-sectional view along arrows E-O-F in FIG. 8A. FIG. 8C is an enlarged view of a part G in FIG. 8B. FIG. 8D is a view illustrating a method for connecting the pin.

As illustrated in FIG. 7A, in the first yoke 121, the inner yoke 130 and the outer yoke 132 have fitting structures for positioning. Specifically, the inner yoke 130 has a pair of fitting projections 150, 150 protruding radially outward from an outer edge of the body thereof. In addition, the body has two fitting projections 152 and two fitting holes 154 are formed alternately in the circumferential direction. The outer yoke 132 has a pair of fitting recesses 156, 156 in an upper end portion of the body thereof, and the pin 112 is formed to protrude downward from a bottom surface of the body. In addition, an opening 158 for mounting the terminal block 126 is formed in a lateral wall of the body. The first yoke 121 is formed by assembly of the inner yoke 130 and the outer yoke 132 with the first coil unit 134 therebetween. In this process, the inner yoke 130 and the outer yoke 132 are positioned by fitting the fitting projections 150 of the inner yoke 130 into the fitting recesses 156 of the outer yoke 132.

Similarly, in the second yoke 122, the inner yoke 140 and the outer yoke 142 have fitting structures for positioning. The inner yoke 140 has the same structure as the inner yoke 130. The outer yoke 142 has substantially the same structure as the outer yoke 132 except that the pin 112 is not formed. The second yoke 122 is formed by assembly of the inner yoke 140 and the outer yoke 142 with the second coil unit 144 therebetween. In this process, the inner yoke 140 and the outer yoke 142 are positioned by fitting the fitting projections 150 of the inner yoke 140 into the fitting recesses 156 of the outer yoke 142.

As illustrated in FIG. 7B, the yoke unit 120 including two layers of upper and lower yokes is formed by assembly of the first yoke 121 and the second yoke 122 along the axial direction. In this process, the first yoke 121 and the second yoke 122 are positioned by fitting the fitting projections 152 of the first yoke 121 and the second yoke 122 into the fitting holes 154 of the second yoke 122 and the first yoke 121, respectively. The yoke unit 120 is subjected to plastic molding, so that the stator coil 33 illustrated in FIGS. 5A to 5F is obtained.

As illustrated in FIGS. 8A to 8C, the pin 112 is integrated with the outer yoke 132 in such a manner that an upper end portion of the pin 112 is connected to the bottom of the outer yoke 132 by swaging. Specifically, as illustrated in FIG. 8D, the pin 112 before being mounted on the outer yoke 132 has a flange portion 170 protruding radially outward at the upper end portion. The pin 112 can be produced by rolling SUS, for example. An insertion hole 172 into which the pin 112 other than the flange portion 170 can be inserted is formed in the bottom of the outer yoke 132. As illustrated, the pin 112 is inserted from its tip into the insertion hole 172, the flange portion 170 is plastically deformed in such a manner that the flange portion 170 is pressed flat, and as a result, the pin 112 can be fixed in a state protruding from the bottom surface of the outer yoke 132. In the process of swaging, fluidization of material of the flange portion 170 occurs, which enables the pin 112 to be stably fixed to the outer yoke 132.

The stator coil 33 having the configuration as described above is mounted on the body 5. In this process, as illustrated in FIG. 4, the stator coil 33 is mounted around (inserted around/outserted around) the can 35 and the pin 112 is fitted in the fitting hole 110. The stator coil 33 is positioned relative to the body 5 on the basis of the positional relation between the fitting part constituted by the pin 112 and the fitting hole 110 and the insertion part where the stator coil 33 is mounted around the can 35. As a result, when the power supply is cut off while the valve is being closed, the magnetic poles of the rotor 31 and those of the stator coil 33 can be made opposite to each other at the reference positions. In other words, the respective parts of the rotor 31 and the stator coil 33 are positioned as such.

Figure 10A:
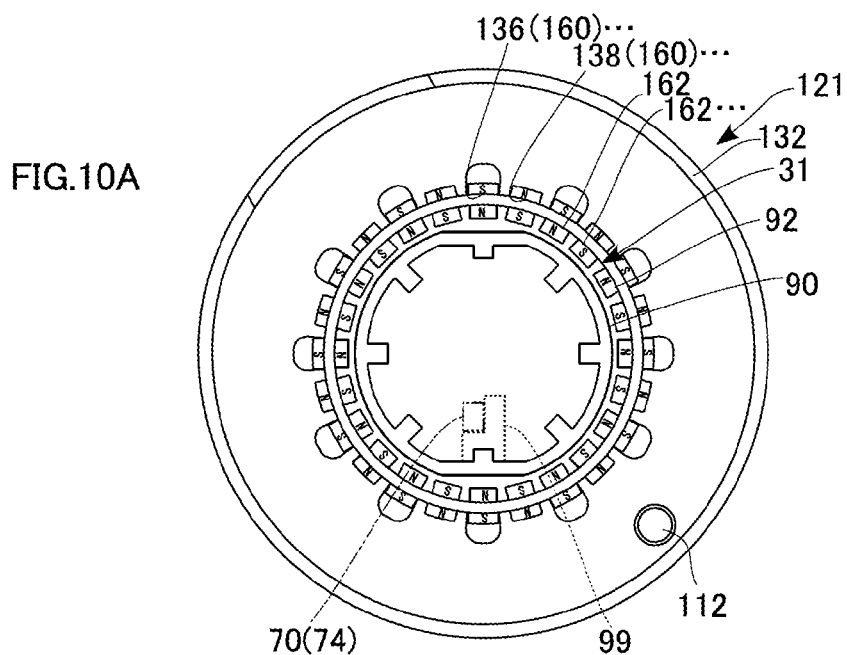
FIGS. 10A to 10C are views illustrating an excited state after the rotor is stopped at the reference position and immediately before power supply is cut off.
Figure 10B:
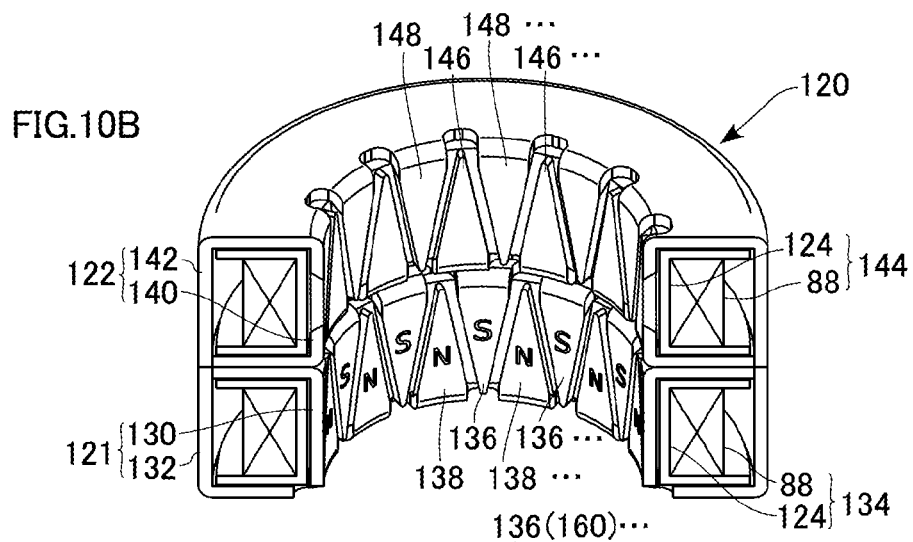
Figure 10C:
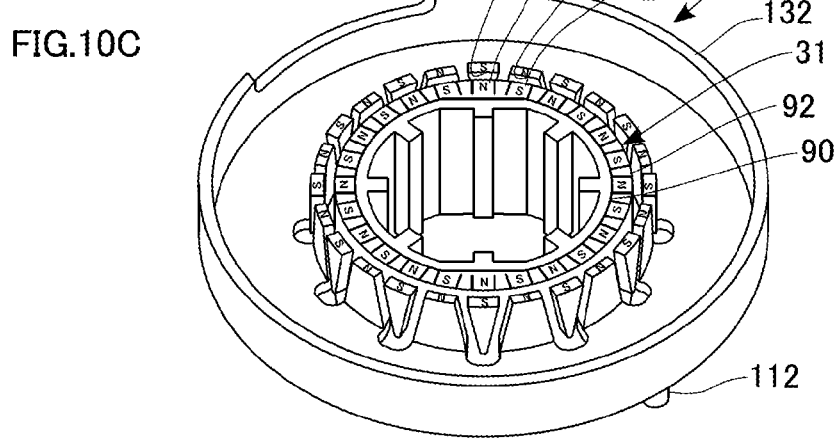

FIGS. 9A to 9G are explanatory views on setting of the reference positions of the rotor 31 and the stator coil 33. FIG. 9A is a plan view, and FIG. 9B is a front view. FIG. 9C is a cross-sectional view along arrows H-H in FIG. 9A, and FIG. 9D is a cross-sectional view along arrows I-I in FIG. 9B. FIG. 9E is a bottom view. FIG. 9F is a cross-sectional view along arrows J-J in FIG. 9C, and FIG. 9G is a cross-sectional view along arrows K-K in FIG. 9C. FIGS. 10A to 10C are views illustrating an excited state after the rotor 31 is stopped at the reference position and immediately before power supply is cut off. FIG. 10A corresponds to FIG. 9G, and FIG. 10C is a perspective view thereof. FIG. 10B is an explanatory view illustrating an excited state of the stator coil 33. For convenience of explanation, the actuating rod 32, the exciting coil 88, the bobbins 124, and the molded part 128 are not depicted as appropriate.

As illustrated in FIGS. 9A to 9E, the rotor 31 and the stator coil 33 are disposed coaxially. In a valve closing operation, the rack 70 reaches the top dead center and is stopped by the stopper 99. As a result, the rotation of the rotor 31 is stopped (see FIGS. 9D and 9F). In this process, the stepping motor is controlled so that the rotor 31 will stop when the shaft 60 is displaced further downward by a predetermined amount (about 0.15 mm, for example) after the valve element 34 illustrated in FIG. 4 touches the valve seat 26. A stable valve closed state (a state in which the valve element 34 is stably seated on the valve seat 26) can be achieved by a resulting biasing force of the spring 63.

In the valve closed state, an elastic reaction force acts on the spring 63. As described above, however, since the screw mechanism between the shaft 60 and the guide member 38 has the self-locking function, the shaft 60 will not be pushed back even when power supply is cut off. Since the magnetism of the magnet 92 remains between the rotor 31 and the stator coil 33 and the self-locking of the screw mechanism functions even after power supply is cut off, the rotor 31 can be stably stopped at the reference position. As a result, when power supply is resumed, the rotor 31 can be driven from the reference position, and the stepping motor can achieve accurate valve opening control.

In order to stably stop the rotor 31 at the reference position in this manner when power supply is cut off, the rotor 31 is designed to be stopped at the reference position by the arrangement of the stopper mechanism. In addition, the stator coil 33 is positioned relative to the body 5 on the basis of the positional relation between the fitting part formed on the surfaces of the stator 33 and the body 5 attached to each other and the insertion part where the can 35 is inserted into the stator coil 33. The fitting part is constituted by the fitting hole 110 formed in the upper end surface of the body 5 and the pin 112 protruding from the bottom surface of the yoke unit 120. The stator coil 33 is provided such that the magnetic poles thereof and those of the rotor 31 are opposite to each other at the reference positions.

Specifically, power supply is cut off in an excited state as illustrated in FIGS. 10A to 10C while the valve is being closed. More specifically, when the stopper 74 of the rack 70 is stopped by the stopper 99, a one-phase excitation state in which only the exciting coil 88 of the first yoke 121 is energized is entered. Then, 24 magnetic poles 160 generated at the first yoke 121 and 24 magnetic poles 162 set for the magnet 92 of the rotor 31 are made opposite to each other. The magnetic poles 160 include the pole teeth 136 constituting the inner yoke 130 and the pole teeth 138 constituting the outer yoke 132. In this process, the pole teeth 136 become S poles and the pole teeth 138 become N poles, which are respectively opposite to the N poles and S poles of the magnetic poles 162 of the magnet 92.

As described above, according to the present embodiment, the pin 112 (fitting part) for positioning the stator coil 33 is directly fixed to the yoke (first yoke 121) where the magnetic poles are formed in the valve closed state. The accuracy of positioning relative to the magnetic poles of the fitting part can be increased, and the accuracy of positioning the stator coil 33 can be improved. Furthermore, the fitting part is provided on a diagonal line (in an unused space near a corner) of the prismatic body 5, which results in space-saving that is advantageous in miniaturization of the control valve 1. Furthermore, since integration of the pin 112 with the yoke is sufficient, there is also an advantage that the positioning is less likely to be affected by deformation of the molded part.

The description of the present invention given above is based upon illustrative embodiments. These embodiments are intended to be illustrative only and it will be obvious to those skilled in the art that various modifications could be further developed within the technical idea underlying the present invention.

In the above-described embodiment, an example in which the pin 112 provided on the stator coil 33 and the fitting hole 110 formed in the body 5 constitute the fitting part has been presented. In a modification, conversely, a fitting hole may be formed in the stator, a pin may be provided on the body, and the fitting hole and the pin may be fitted to each other. Alternatively, fitting holes may be formed both in the stator and in the body, and a separately-provided pin may be fitted into the fitting holes so that the stator and the body are connected with each other.

In the above-described embodiment, an example in which the reference positions are set in the valve closed state has been presented. In a modification, reference positions may be set in the fully open state of the valve section. The magnetic poles of the stator and those of the rotor may then be made opposite to each other at the reference positions. In this case as well, the stator is positioned relative to the body on the basis of the positional relation between the fitting part formed on the surfaces of the stator and the body attached to each other and the insertion part where the can is inserted into the stator.

Although the motor operated valve is an expansion valve in the above-described embodiment, the motor operated valve may be an on-off valve without the expanding function.

In the above-described embodiment, an example in which the motor operated valve is a two-way valve having one outlet port with respect to one inlet port has been presented. In a modification, the motor operated valve may be a three-way valve having two outlet ports with respect to one inlet port or a four-way valve having two outlet ports with respect to two inlet ports. In such cases as well, the stator is positioned relative to the body on the basis of the positional relation between the fitting part formed on the surfaces of the stator and the body attached to each other and the insertion part where the can is inserted into the stator, and provided in such a manner that the magnetic poles thereof and those of the rotor are made opposite to each other at the reference positions.

In the above-described embodiment, an example in which the valve element 34 is supported coaxially by the leading end of the shaft 60 and driven in the axial direction by the motion converting mechanism has been presented. Specifically, the configuration in which the motor operated valve includes the motion converting mechanism that converts the rotational movement of the rotor to the translational movement of the shaft has been presented. In a modification, the axis of the shaft and that of the valve element may be misaligned. For example, the axes may be misaligned in parallel. Alternatively, the valve element may be rotated around the axis thereof by the rotational movement of the rotor, and the valve section (valve hole) may be opened and closed according to the rotational position (sliding position) of the valve element. In this case, the valve opening degree may be varied depending on the rotational position of the valve element. A gear mechanism may be disposed between the shaft and the valve element. The positioning structures of the rotor and the stator described in the above-described embodiment or modifications may be employed in a motor operate expansion valve disclosed in Japanese Patent Application Publication No. 2000-346227 or a motor operated valve described in Japanese Patent Application Publication No. 2014-190494, for example.

Although the motor operated valve according to the above-described embodiment is suitably applied to a refrigeration cycle using an alternative for chlorofluorocarbon (HFC-134a) or the like as the refrigerant, the motor operated valve can also be applied to a refrigeration cycle using a refrigerant such as carbon dioxide with high working pressure. In this case, an external heat exchanger such as a gas cooler is provided instead of the condenser in the refrigeration cycle.

Although an example in which the motor operated valve is applied to a refrigeration cycle in an automotive air conditioner has been presented in the above-described embodiment, the motor operated valve can also be applied to an air conditioner using a motor operated expansion valve other than those for vehicles. Furthermore, the motor operated valve may be a motor operated valve for controlling a flow of fluid other than refrigerant.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:

1. A motor operated valve driven by a stepping motor, comprising:
    a body having an inlet port through which fluid is introduced from an upstream side, an outlet port through which fluid is delivered to a downstream side, and a valve hole through which the inlet port and the outlet port communicate with each other;
    a valve element configured to open and close a valve section by moving away from and toward the valve hole;
    a stepping motor including a stator mounted on an end surface of the body, and a rotor configured to be rotated when power is supplied to the stator, for driving the valve element in opening and closing directions of the valve section;
    a shaft coaxially fixed to the rotor, and supported by the body such that the shaft is rotatable about an axis of the shaft a predetermined number of times, the shaft being configured to transmit a driving force of the stepping motor to the valve element;
    a stopper mechanism for restricting a rotation amount of the shaft; and
    a can fixed to the body, the can being a cylindrical member covering a space in which the valve element, the shaft, and the stopper mechanism are disposed and containing the rotor, the can defining an internal space in which a fluid pressure acts and an external space in which no fluid pressure acts, the can being coaxially inserted into the stator,
    wherein positions of the stator and the rotor in a rotating direction when the shaft is stopped by an operation of the stopper mechanism are set to be reference positions at which magnetic poles of the stator and magnetic poles of the rotor are opposite to each other,
    wherein the rotor is configured to be stopped at the reference position by an arrangement of the stopper mechanism,
    wherein the stator is positioned relative to the body according to a positional relation between a fitting part, formed on surfaces of the stator and the body attached to each other, and an insertion part where the can is inserted into the stator, and magnetic poles of the stator and magnetic poles of the rotor are opposite to each other at the reference positions, and
    wherein the surfaces of the stator and the body attached to each other are surfaces of the stator and the body facing each other in an axial direction, and the fitting part is present between the stator and the body.

2. A motor operated valve according to claim 1, wherein the fitting part includes a pin formed on one of a surface of the stator and a surface the body facing each other, and a fitting hole that is formed in another of the surfaces and into which the pin is fitted.

3. A motor operated valve according to claim 2, wherein the fitting part includes the pin formed on the stator and the fitting hole formed in the body.

4. A motor operated valve according to claim 3, wherein the body has a prismatic shape, and wherein the fitting hole is formed substantially on a diagonal line of the end surface of the body.

5. A motor operated valve according to claim 1, further comprising a motion converting mechanism configured to convert rotational movement of the rotor into translational movement of the shaft,
    wherein the valve element is supported by a leading end of the shaft,
    wherein the motion converting mechanism has a screw mechanism including an external thread portion formed on a side of the shaft and an internal threaded portion formed on a side of the body and configured to be engaged with the external thread portion, and
    wherein the screw mechanism has a lead angle set so as to be self-locked when power supply to the stator is cut off in a state in which magnetic poles of the stator and magnetic poles of the rotor are opposite to each other.

6. A motor operated valve driven by a stepping motor, comprising:
    a body having an inlet port through which fluid is introduced from an upstream side, an outlet port through which fluid is delivered to a downstream side, and a valve hole through which the inlet port and the outlet port communicate with each other;

a valve element configured to open and close a valve section by moving away from and toward the valve hole;

a stepping motor including a stator mounted on an end surface of the body, and a rotor configured to be rotated when power is supplied to the stator, for driving the valve element in opening and closing directions of the valve section;

a shaft coaxially connected with the rotor, and configured to transmit a driving force of the stepping motor to the valve element;

a stopper mechanism for restricting a rotation amount of the shaft; and a can fixed to the body, the can being a cylindrical member covering a space in which the valve element, the shaft, and the stopper mechanism are disposed and containing the rotor, the can defining an internal space in which a fluid pressure acts and an external space in which no fluid pressure acts, the can being coaxially inserted into the stator, wherein positions of the stator and the rotor in a rotating direction when the shaft is stopped by an operation of the stopper mechanism are set to be reference positions at which magnetic poles of the stator and magnetic poles of the rotor are opposite to each other, wherein the rotor is configured to be stopped at the reference position by an arrangement of the stopper mechanism, wherein the stator is positioned relative to the body according to a positional relation between a fitting part, formed on surfaces of the stator and the body attached to each other, and an insertion part where the can is inserted into the stator, and magnetic poles of the stator and magnetic poles of the rotor are opposite to each other at the reference positions, wherein the fitting part includes a pin formed on one of a surface of the stator and a surface the body facing each other, and a fitting hole that is formed in an other of the surfaces and into which the pin is fitted, wherein the fitting part includes the pin formed on the stator and the fitting hole formed in the body, wherein the stator includes:
  a yoke having a plurality of magnetic poles arranged annually;
  a bobbin mounted on the yoke in such a manner that the magnetic poles are inserted into the bobbin; and
  an exciting coil wound around the bobbin, and wherein the pin is formed integrally with the yoke in such a manner that the pin protrudes from an end surface of the yoke.

7. A motor operated valve according to claim 6,
wherein the pin is integrated with the yoke in such a manner that the pin is partially swaged into a hole formed in the end surface of the yoke.

8. A motor operated valve driven by a stepping motor, comprising:
a body having an inlet port through which fluid is introduced from an upstream side, an outlet port through which fluid is delivered to a downstream side, and a valve hole through which the inlet port and the outlet port communicate with each other;

a valve element configured to open and close a valve section by moving away from and toward the valve hole;

a stepping motor including a stator mounted on an end surface of the body, and a rotor configured to be rotated when power is supplied to the stator, for driving the valve element in opening and closing directions of the valve section;

a shaft coaxially connected with the rotor, and configured to transmit a driving force of the stepping motor to the valve element;

a stopper mechanism for restricting a rotation amount of the shaft;

a can fixed to the body, the can being a cylindrical member covering a space in which the valve element, the shaft, and the stopper mechanism are disposed and containing the rotor, the can defining an internal space in which a fluid pressure acts and an external space in which no fluid pressure acts, the can being coaxially inserted into the stator; and a motion converting mechanism configured to convert rotational movement of the rotor into translational movement of the shaft, wherein positions of the stator and the rotor in a rotating direction when the shaft is stopped by an operation of the stopper mechanism are set to be reference positions at which magnetic poles of the stator and magnetic poles of the rotor are opposite to each other, wherein the rotor is configured to be stopped at the reference position by an arrangement of the stopper mechanism, wherein the stator is positioned relative to the body according to a positional relation between a fitting part, formed on surfaces of the stator and the body attached to each other, and an insertion part where the can is inserted into the stator, and magnetic poles of the stator and magnetic poles of the rotor are opposite to each other at the reference positions, wherein the valve element is supported by a leading end of the shaft, wherein the motion converting mechanism has a screw mechanism including an external thread portion formed on a shaft side and an internal threaded portion formed on a body side and configured to be engaged with the external thread portion, wherein the screw mechanism has a lead angle set so as to be self-locked when power supply to the stator is cut off in a state in which magnetic poles of the stator and magnetic poles of the rotor are opposite to each other, and wherein the stopper mechanism includes:
  a worm gear formed integrally with the shaft;
  a rack gear configured to be engaged with the worm gear;
  a rack gear guide formed integrally with the body and configured to guide the rack gear so that the rack gear makes translational movement parallel to an axis of the worm gear; and
  a stopper formed integrally with the shaft on one end side of the worm gear, and configured to restrict rotation of the shaft by stopping the rack moving in one direction and by being stopped by the rack gear.

* * * * *